United States Patent [19]
Kanda et al.

[11] Patent Number: 5,930,400
[45] Date of Patent: *Jul. 27, 1999

[54] IMAGE PROCESSING DEVICE AND METHOD FOR AMENDING BOX OF COMPRESSED IMAGE

[75] Inventors: Takayuki Kanda; Naomi Miyashita, both of Tokyo; Masayuki Aoki, Kawasaki, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,144

[22] Filed: May 7, 1996

[30] Foreign Application Priority Data

Sep. 28, 1995 [JP] Japan ................................. 7-250815

[51] Int. Cl.$^6$ ................................................. H04N 1/415
[52] U.S. Cl. .......................... 382/248; 382/250; 358/433; 358/432
[58] Field of Search ..................... 358/433, 432, 358/453, 426, 452, 448; 382/293, 173, 248, 250, 294

[56] References Cited

U.S. PATENT DOCUMENTS

| | | | |
|---|---|---|---|
| 5,128,776 | 7/1992 | Scores | 358/453 |
| 5,473,740 | 12/1995 | Kasson | 358/453 |
| 5,481,372 | 1/1996 | Kouno et al. | 358/433 |
| 5,488,484 | 1/1996 | Miyano | 358/433 |
| 5,513,282 | 4/1996 | Williams | 358/453 |

FOREIGN PATENT DOCUMENTS

| | | |
|---|---|---|
| 0 272 277 | 12/1993 | European Pat. Off. . |
| 5-14737 | 1/1993 | Japan . |

*Primary Examiner*—Edward L. Coles
*Assistant Examiner*—Cheukfan Lee
*Attorney, Agent, or Firm*—Staas & Halsey

[57] ABSTRACT

In compressing a static image, image data is displayed in the window on the display unit, and the operator specifies a segmented rectangle. The specific coordinates of the segmented rectangle are stored as positional coordinate information, and are amended in an amending process so that the segmented rectangle may not destroy the basic blocks used in the compressing process. The image segmented by the amended and segmented rectangle is an image formed by basic blocks, and the data is not rounded in the recompressing process, thereby successfully maintaining the quality of the image.

17 Claims, 14 Drawing Sheets

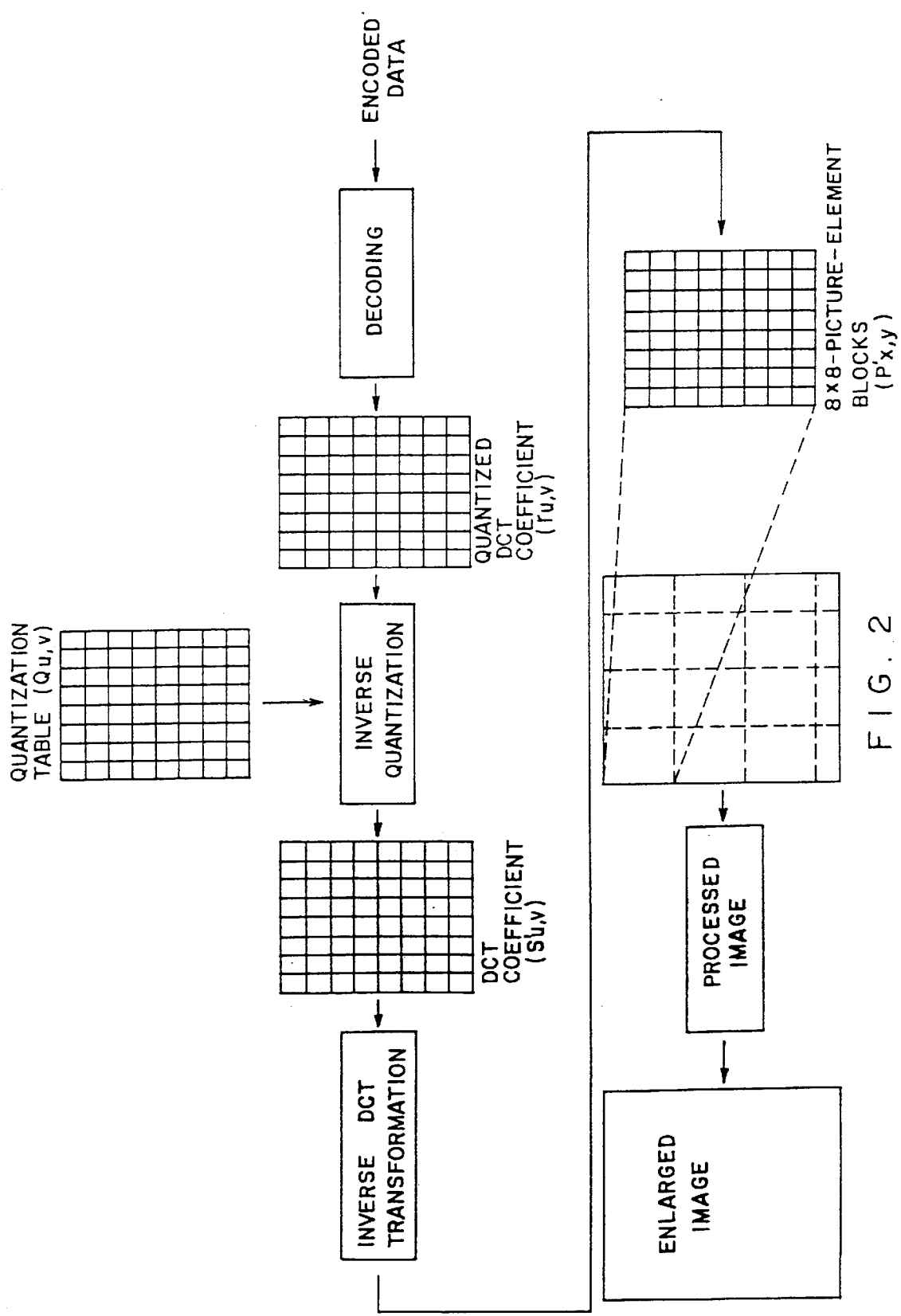
F I G. 2

IMAGE PROCESSING DEVICE AND METHOD FOR AMENDING BOX OF COMPRESSED IMAGE

BACKGROUND OF THE INVENTION

1. Field of the Invention

The present invention relates to a static image compressing process, and to an image processing device and method for performing a user-specified process on the image and then compressing the image.

2. Description of the Related Art

Recently, a JPEG (joint photographic experts group) baseline compressing system has been popularly used when a static image is compressed in an image processing system for newspapers and printed matters using common photo-retouching software, etc. The JPEG baseline compressing process is a compressing method prescribed by the JPEG, that is, a committee for the standardization in encoding static color images in the CCITT (International Telegraph and Telephone Consultative Committee) Group VIII.

FIG. 1 shows the JPEG baseline compressing process. In the JPEG baseline compressing process, an image to be compressed is divided into basic 8×8-picture element blocks and then compressed. A picture element value $P_{x,y}$ is converted into a DCT coefficient $S_{u,v}$ in a DCT transformation (discrete cosine transformation) in basic block units. The basic equation of the DCT transformation is as follows.

$$S_{u,v} = \frac{1}{4} C_u C_v \sum_{x=0}^{7} \sum_{y=0}^{7} (P_{x,y} - L_s) \cos\frac{(2x+1)u\pi}{16} \cos\frac{(2y+1)v\pi}{16} \quad (1)$$

where x and y indicate the positions of the picture element blocks on the X Y plain, and constants $C_u$, $C_v$, and $L_s$ are defined by the following equation.

$$C_u, C_v = \begin{cases} \frac{1}{\sqrt{2}}: & u, v = 0 \\ 1: & \text{others} \end{cases}$$

$$L_s = 128$$

The DCT coefficient $S_{u,v}$ is quantized using a quantization table $Q_{u,v}$ and is converted into a quantized DCT coefficient $r_{u,v}$. The $r_{u,v}$ is basically obtained by the following equation.

$$r_{u,v} = \text{round}(S_{u,v}/Q_{u,v}) \quad (2)$$

In equation (2), round (X) is a function replacing the real number X with an integer closest to the real number X. The value $r_{u,v}$ is encoded, and then transmitted as encoded data through a transmission line such as a circuit, etc.

FIG. 2 shows the reconstruction process by the system for receiving the encoded data of the image. The encoded data is decoded into a quantized DCT coefficient $r_{u,v}$ and then inversely quantized using the quantization table $Q_{u,v}$ used in the compressing process. Thus, the obtained DCT coefficient $S'_{u,v}$ is converted into the picture element value $P'_{x,y}$ in basic blocks in the inverse DCT transformation, and the image can be enlarged using the $P_{x,y}$.

Since the rounding process is performed on $S_{u,v}/Q_{u,v}$ in the quantization process in the JPEG baseline compressing process, a DCT coefficient $S_{u,v}$ before the quantization does not normally match a DCT coefficient $S'_{u,v}$ after the inverse quantization. Therefore, the picture element value PXY before the DCT transformation does not match the picture element value $P'_{x,y}$ after the inverse DCT transformation. However, when the data $P'_{x,y}$ obtained as a result of once enlarging a compressed image is compressed again, no rounding process is performed in the quantization because the DCT coefficient obtained by DCT transforming $P'_{x,y}$ under the same conditions is represented as being rounded and therefore is necessarily an integer.

However, in the image processing system for performing the conventional JPEG baseline compressing process, the quality of the image is gradually deteriorated if the JPEG enlarging process, image process, and JPEG compressing process are repeatedly performed.

When the compressing and enlarging processes are repeated under the same conditions, the original image does not become different from the enlarged image through the deterioration of the data, that is, through the rounding process. However, if the compressing process is performed after the segmenting process of the trimming process, etc., the configuration of the basic blocks (for compression) is destroyed. In this case, since new basic blocks are established according to the trimming box, fragments are newly generated through the quantization by equation (2), thereby degenerating the data. Thus, when a trimming process is performed in the conventional image process, the image is segmented by a trimming box of the position and size specified by the operator. Therefore, the basic block for compression has been changed with the quality of the image deteriorated.

SUMMARY OF THE INVENTION

The present invention aims at providing an image processing device and method for compressing a processed image without deteriorating the quality of the image in a static image compressing process.

The present invention relates to a static image compressing process to perform a user-specified image process and then recompress the processed image. This image processing device comprises an input unit; image box specifying unit; box information storage unit; processing unit; and amending unit.

In the image processing device according to the present invention, the input unit first receives image data. Then, the user specifies the segmentation of an image to be processed through the image box specifying unit. The specified image to be processed is stored in the box information storage unit with the segmentation position stored, for example, as points of the diagonal line of the segmented rectangle.

The segmented image to be processed is determined regardless of the logical block used in the compressing process (basic block). Therefore, if the compressing process is performed, the outline of the basic block is changed each time the compressing process is performed, thereby rounding the data at each compressing process. Therefore, the positional information stored by the box storage unit is amended in a way that the outline of the image to be processed is set at the outline of the basic block.

The processing unit processes image data in an image box amended by the amending unit. Therefore, the processed image does not change the basic block of the original image.

The amending unit amends the positional information in the box storage unit according to the amendment standard that, for example, an image box is formed for the amended image at the outline of the basic block of the picture elements used in the compressing process. The processing unit processes images in basic block units. Thus, for example, when an image is segmented in basic block units in the image processed in the compressing and enlarging processes, no fragments are generated in the quantizing process by equation (2) even if the segmented image is recompressed, thereby preventing the quality of the image from being lowered. Therefore, the deterioration of the quality of the image can be minimized when the image is processed by repeating the compressing and enlarging processes.

BRIEF DESCRIPTION OF THE DRAWINGS

FIG. 2 shows the reconstructing process performed on an image processed by the JPEG baseline compressing process;

DESCRIPTION OF THE PREFERRED EMBODIMENTS

The embodiments of the present invention are described in detail by referring to the attached drawings.

Figure 3:
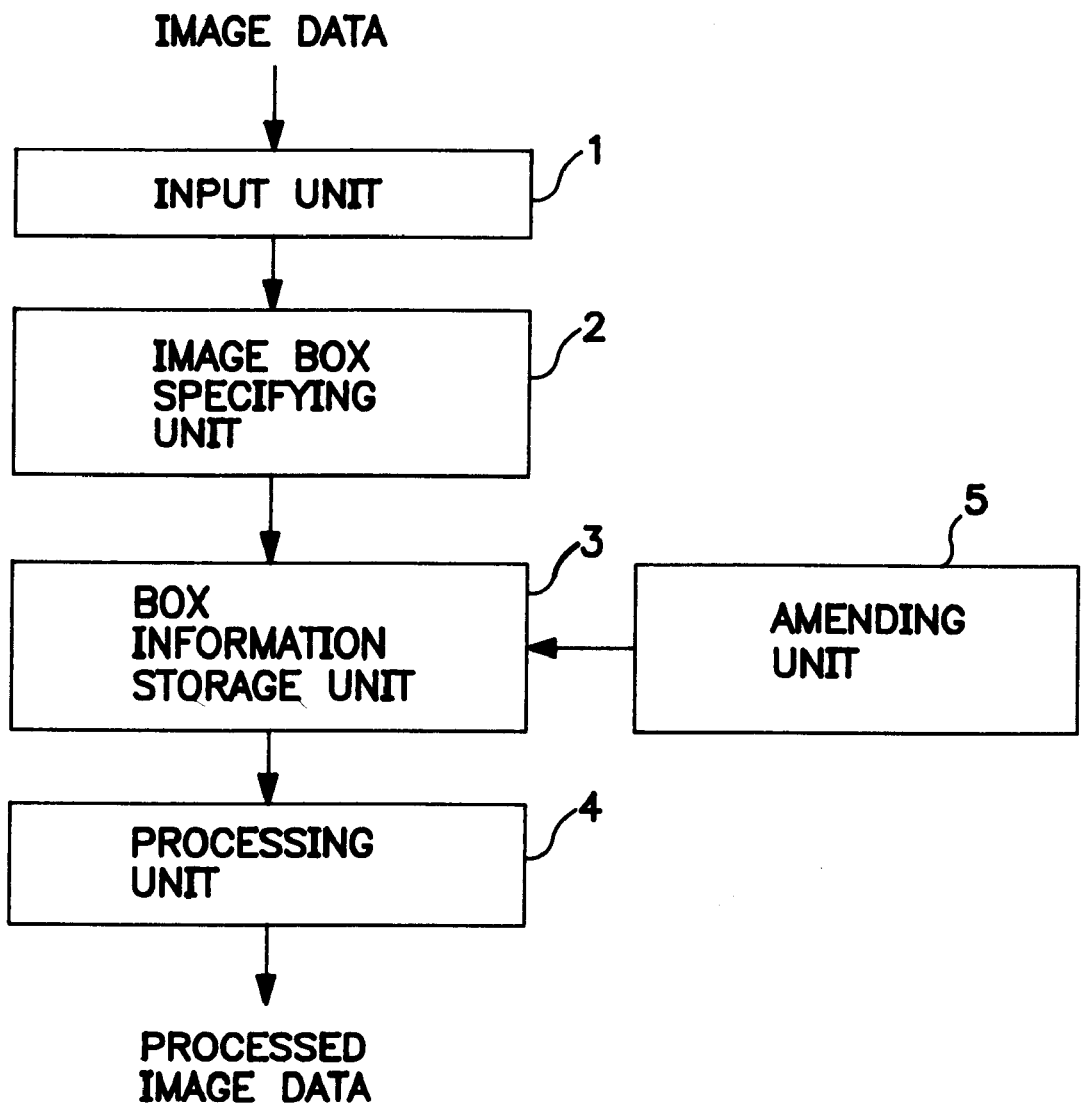
FIG. 3 shows the principle of the present invention.

FIG. 3 shows the principle of the image processing device according to the present invention. The image processing device shown in FIG. 3 comprises an input unit 1; an image box specifying unit 2; a box information storage unit 3; a processing unit 4; and an amending unit 5.

The input unit 1 inputs image data.

The image box specifying unit 2 specifies an image box within the image represented by the input image data.

The box information storage unit 3 stores the positional information about the specified image box.

The amending unit 5 amends the positional information stored in the box information storage unit 3 according to a predetermined standard.

The processing unit 4 processes the image data using the image box amended by the amending unit 5.

The processing unit 4 performs, for example, a segmenting process, etc. on an image using a new image box amended by the amending unit 5 on the image box specified by the image box specifying unit 2. Therefore, a specified image box can be changed so that the original basic block may not be destroyed by the processed image.

The amending unit 5, for example, follows the amendment standard to form an amended image box on the outline of the logical block (basic block) of the picture elements used in the compressing unit. The positional information is amended to satisfy the standard. Thus, the image box optionally specified by the operator is changed just to meet the outline of the basic block. The processing unit 4 processes an image in basic block units using the amended image box. When, for example, the image is segmented in basic block units within the image processed in the compressing and enlarging processes, no fragments are generated in the quantizing process by equation (2) even if the segmented image is recompressed, thereby preventing the quality of the image from being lowered. Therefore, the deterioration of the quality of the image can be minimized when the image is processed by repeatedly performing the compressing and enlarging processes.

Figure 4:
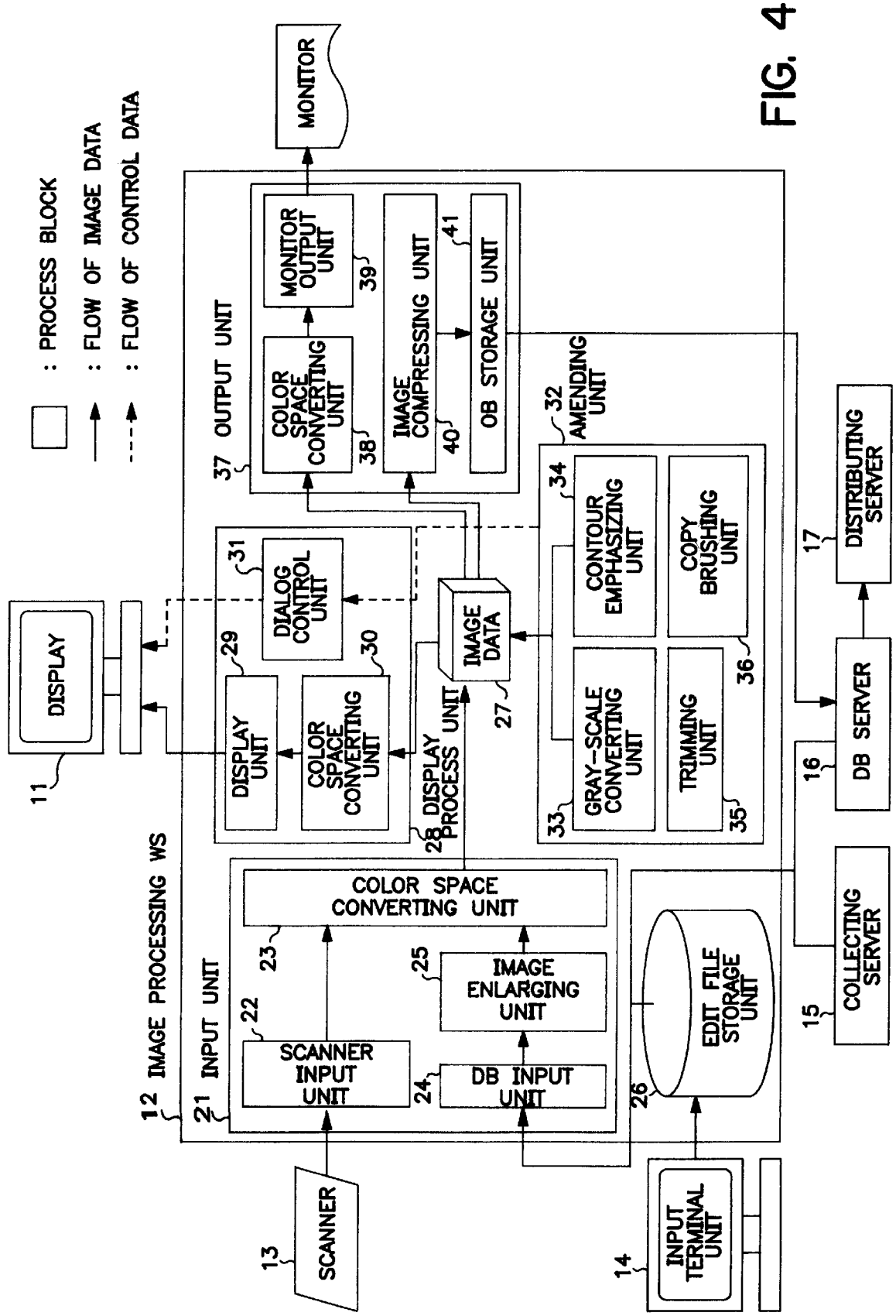
FIG. 4 shows the system according to the embodiment.

For example, the input unit 1 shown in FIG. 3 corresponds to an input unit 21 shown in FIG. 4. The image box specifying unit 2 corresponds to an input device such as a pointing device, etc. in an image processing workstation 12. For example, the box information storage unit 3 corresponds to the memory of the image processing workstation 12. The processing unit 4 and amending unit 5 correspond to an amending unit 32.

FIG. 4 shows the configuration of the image processing system according to the present embodiment. In the image processing system shown in FIG. 2, the image processing workstation (WS) 12 generates image data 27 based on the input data from a scanner 13, an input terminal unit 14, a collecting server 15, a database server 16, etc., and displays an image on the screen of the display device 11. In FIG. 4, the bold lines indicate the flow of image data while the broken lines indicate the flow of control data. For example, the JPEG baseline compressing process is used as an image compressing method.

The image processing workstation 12 comprises the input unit 21; a display process unit 28; the amending unit 32; and an output unit 37. In the input unit 21, the color space information in the data input to an scanner input unit 22 from the scanner 13 is converted by a color space converting unit 23 and the entire data is output as the image data 27. Otherwise, the data input to a database input unit 24 is enlarged by an image enlarging unit 25 and its color space information is converted by the color space converting unit 23. An edit file storage unit 26 stores a file inputed from the input terminal unit 14 as an edit file. The edit file is inputed to the database input unit 24. The input file to the database input unit 24 can be a file from the collecting server 15 or database server 16.

The amending unit 32 comprises various image processing units such as a gray-scale converting unit 33; contour emphasizing unit 34; trimming unit 35; and copy brush unit 36, etc., and processes and amends the image data 27 according to the instruction of the operator.

In the display process unit 28, the image data 27 is converted by a color space converting unit 30, and displayed on the display device 11 by a display unit 29. A dialog control unit 31 controls the display of various processes performed by the amending unit 32.

In the output unit 37, the image data 27 is compressed by an image compressing unit 40 and stored in the database server 16 by a database storage unit 41. The compressed data stored in the database server 16 can be input again to the input unit 21 and returned to the image data 27. The data can also be transferred to another image processing system. Then, the image data 27 is converted by a color space converting unit 38, output by a monitor output unit 39 to be monitored.

Figure 5:
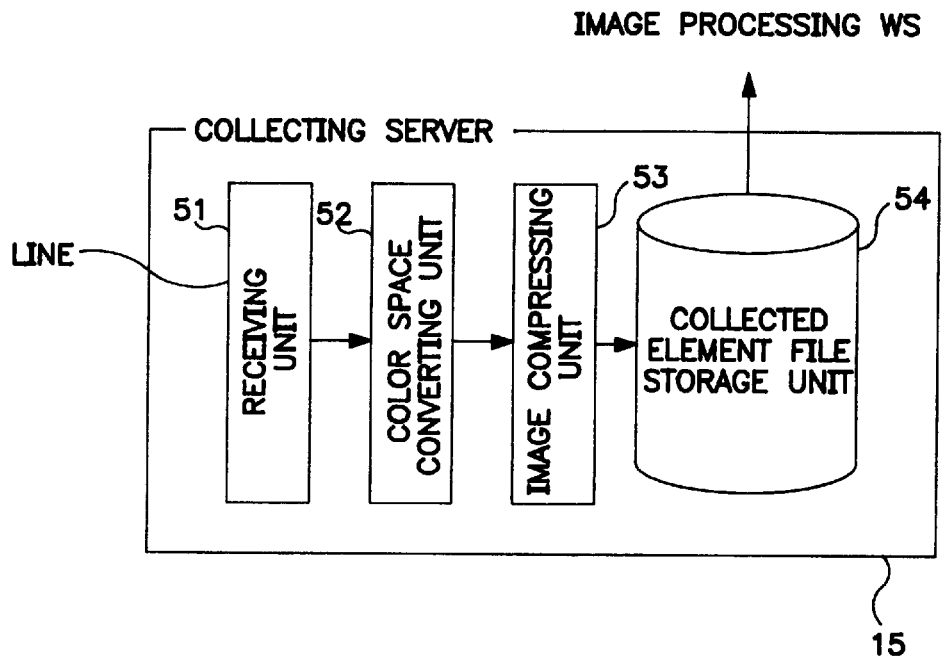
FIG. 5 shows the configuration of the collecting server.
Figure 6:
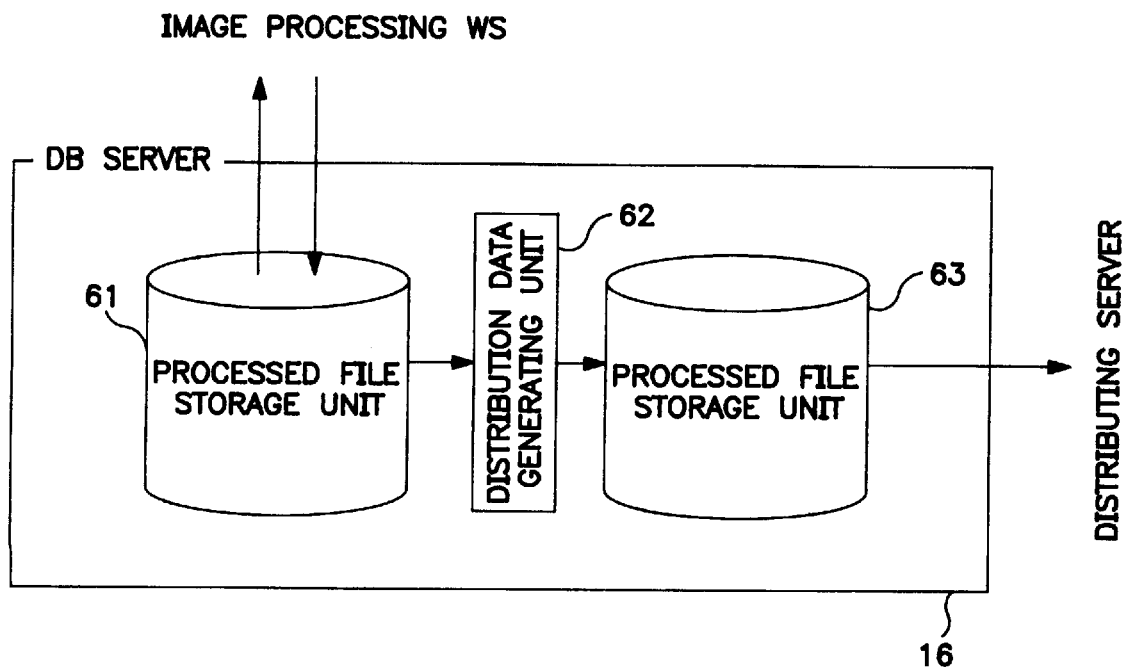
FIG. 6 shows the configuration of the data base server.

FIGS. 5 and 6 show the configurations of the collecting server 15 and database server 16. The collecting server 15 shown in FIG. 5 comprises a receiving unit 51; a color space converting unit 52, an image compressing unit 53; and a collected element file storage unit 54. The receiving unit 51, for example, fetches transmission data received from another image processing system via communications lines. The fetched data is converted by the color space converting unit 52, compressed by the image compressing unit 53, and stored in the collected element file storage unit 54 as a collected element file. If the received data is compressed image data, it does not necessarily have to be recompressed. The collected element file is input to the input unit 21 of the image processing workstation 12.

The database server 16 shown in FIG. 6 comprises a processed file storage unit 61; a distribution data generating unit 62; and a complete file storage unit 63. The processed file storage unit 61 stores the data received from the output unit 37 of the image processing workstation 12 as a processed file. The distribution data generating unit 62 generates distribution data from the processed file, and stores the data in the complete file storage unit 63 as a complete file. The complete file is output to a distributing server. The processed file can be returned to the image processing workstation 12.

Figure 7:
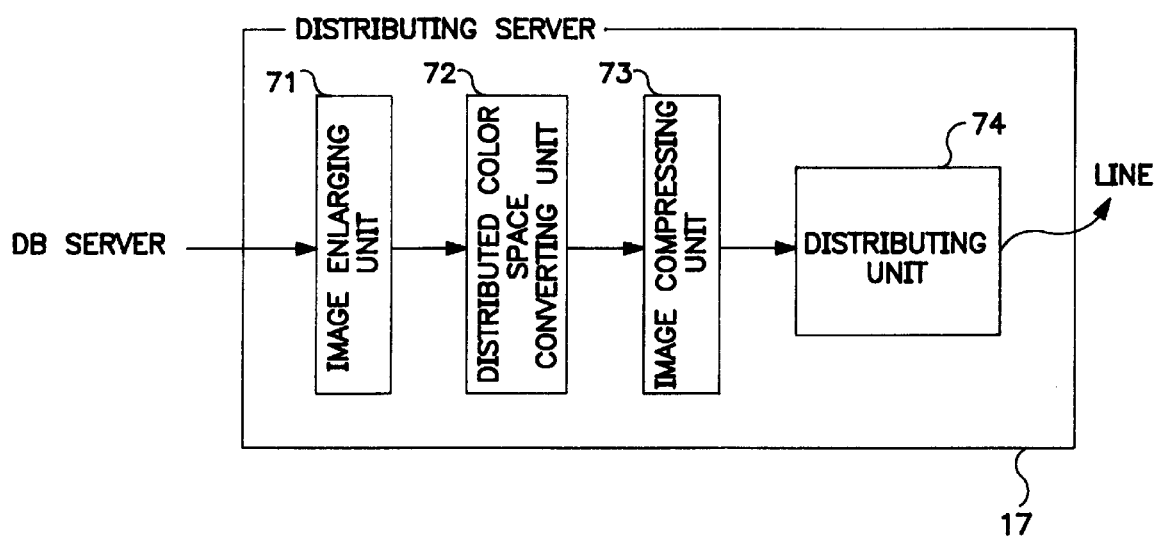
FIG. 7 shows the configuration of the distributing server.

FIG. 7 shows the configuration of the distributing server 17. A distributing server 17 shown in FIG. 7 comprises an image enlarging unit 71; a distributed color space converting unit 72; an image compressing unit 73; and a distributing unit 74. The complete file input from the database server 16 is enlarged by the image enlarging unit 71, and then converted by the distributed color space converting unit 72 and compressed again by the image compressing unit 73. Then, the file is transmitted by the distributing unit 74 to another image processing system, etc. connected through the communications lines.

The configurations of the collecting server 15 shown in FIG. 5, the database server 16 shown in FIG. 6, and the distributing server 17 shown in FIG. 7 are examples only, and can be replaced with other appropriate configurations.

When the JPEG baseline compressing process is performed, image data is compressed after being divided into basic 8×8-picture-element blocks. According to the present invention, the JPEG-compressed image is enlarged, divided into logical and basic blocks to prevent the quality of the image from being lowered, and then be processed. When the image is processed, for example, segmented, an operator-specified segmentation position (trimming position) should be amended such that the image is segmented in basic block units. Since the segmentation position is amended not to destroy the basic blocks, no data is further rounded in the quantizing process. Thus maintaining the characteristics of the basic blocks minimizes the deterioration of the quality of the image even if the image is recompressed after the segmentation.

For example, if image data of a photo to be published in a printed matter is received from abroad and distributed to each of the domestic press companies after recompressing a part of the received data, then the deterioration of the quality of the image accompanying the segmentation of the image can be prevented from being lowered.

The image segmenting process is described below by referring to FIGS. 8 through 15.

Figure 8:
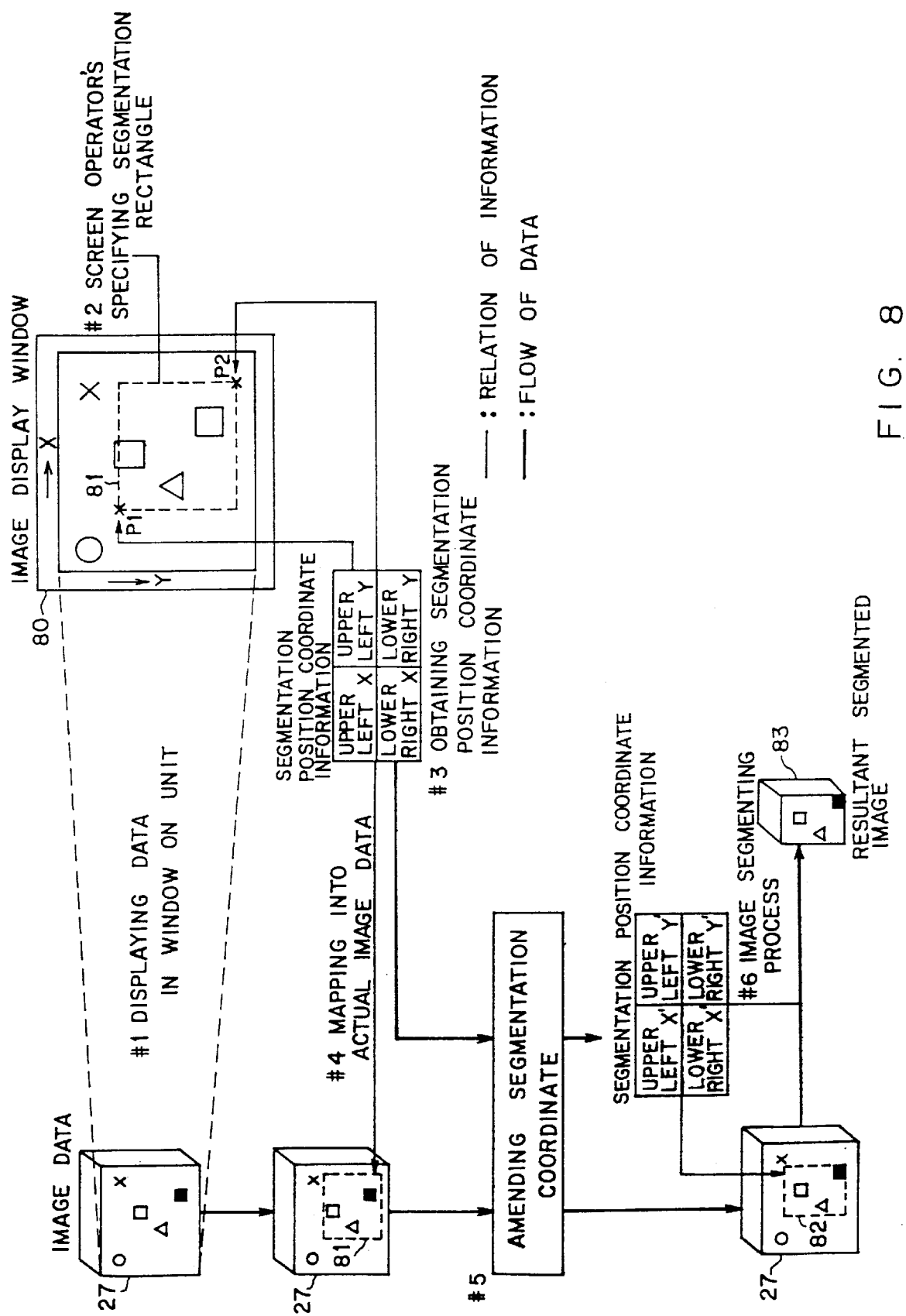
FIG. 8 shows the image segmenting process.

FIG. 8 shows the outline of the image segmenting process performed by the trimming unit 35 shown in FIG. 4. In FIG. 8, the image segmenting process is performed in the following procedure.

1: The display unit 29 displays the image data 27 in a window 80 on the display device 11.

2: The operator specifies the position and size of a segmented rectangle 81 (segmentation box) of the image using the pointing device (not shown in the attached drawings) of the image processing workstation 12.

3: The trimming unit 35 obtains the position coordinate information of the segmented rectangle and stores it in the memory (not shown in the attached drawings) in the image processing workstation 12. The segmentation position coordinate information can be the coordinates of the two points of the diagonal of the segmented rectangle. In this example, each value of the X coordinate (upper left X) and Y coordinate (upper left Y) of the upper left point P1, and the X coordinate (lower right X) and Y coordinate (lower left Y) of the lower right point P2 are stored as segmentation position coordinate information. In this example, the X axis is set in the horizontal direction on the screen while the Y axis is set in the vertical direction.

4: The trimming unit 35 maps the segmentation position coordinate information on the image data 27 of an actual image.

5: The trimming unit 35 amends the segmentation coordinate to amend the position and size in a way that the segmented rectangle 81 can be structured along the boundary lines of the basic blocks. As a result, the X and Y coordinates of the upper left point of an amended segmented rectangle 82 are respectively upper left X' and upper left Y' while the X and Y coordinates of the lower right point of an amended segmented rectangle 82 are respectively lower right X' and lower right Y'.

6: The trimming unit 35 segments an image from the image data 27 according to the position coordinate information about the amended segmented rectangle 82 amended in #5 and outputs the segmented image as a resultant segmented image 83. The resultant segmented image 83 is displayed by the display process unit 28 on the display device 11, or passed to the database server 16 after being compressed by the output unit 37.

Figure 1:
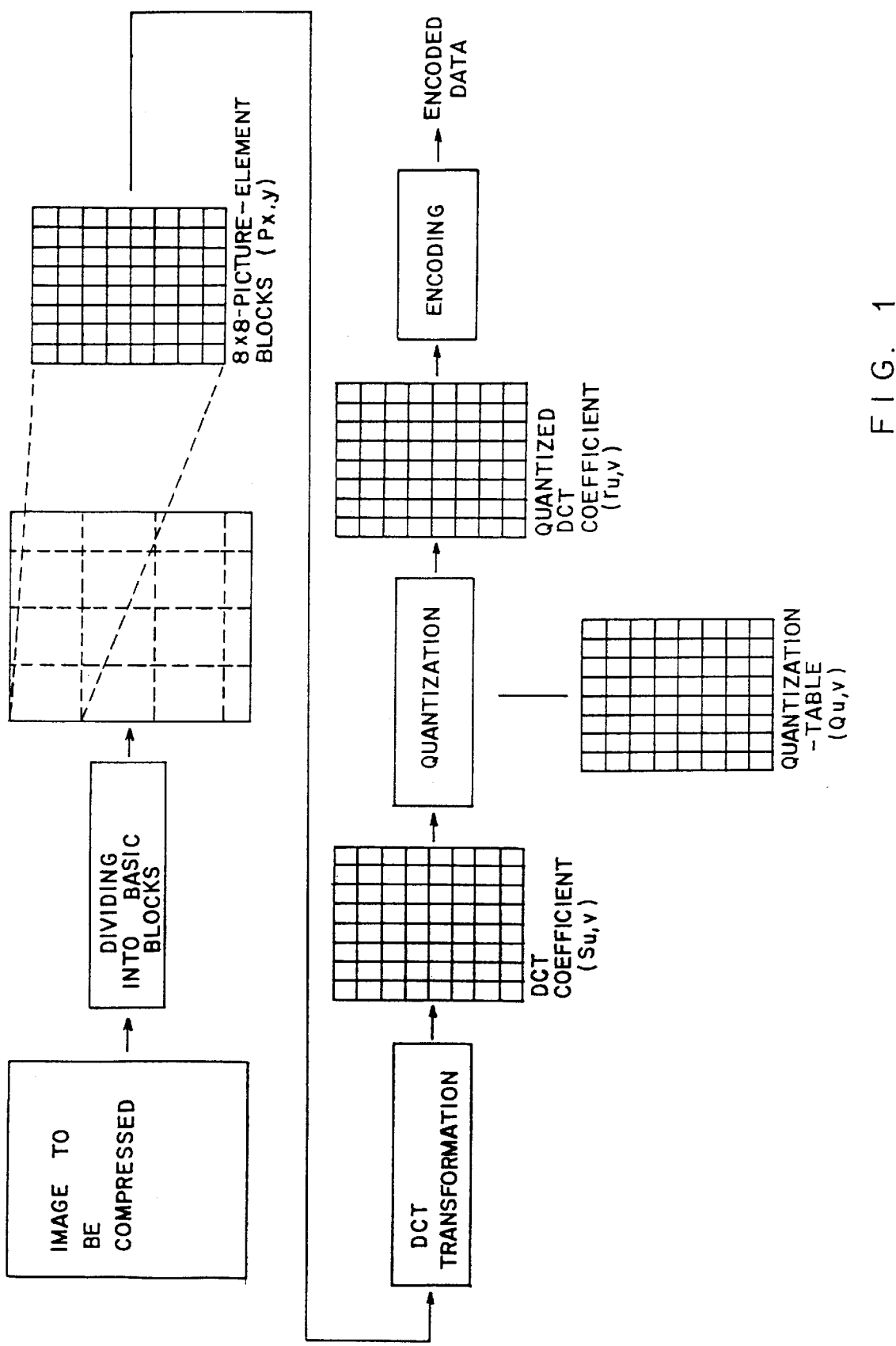
FIG. 1 shows the JPEG baseline compressing process.
Figure 9:
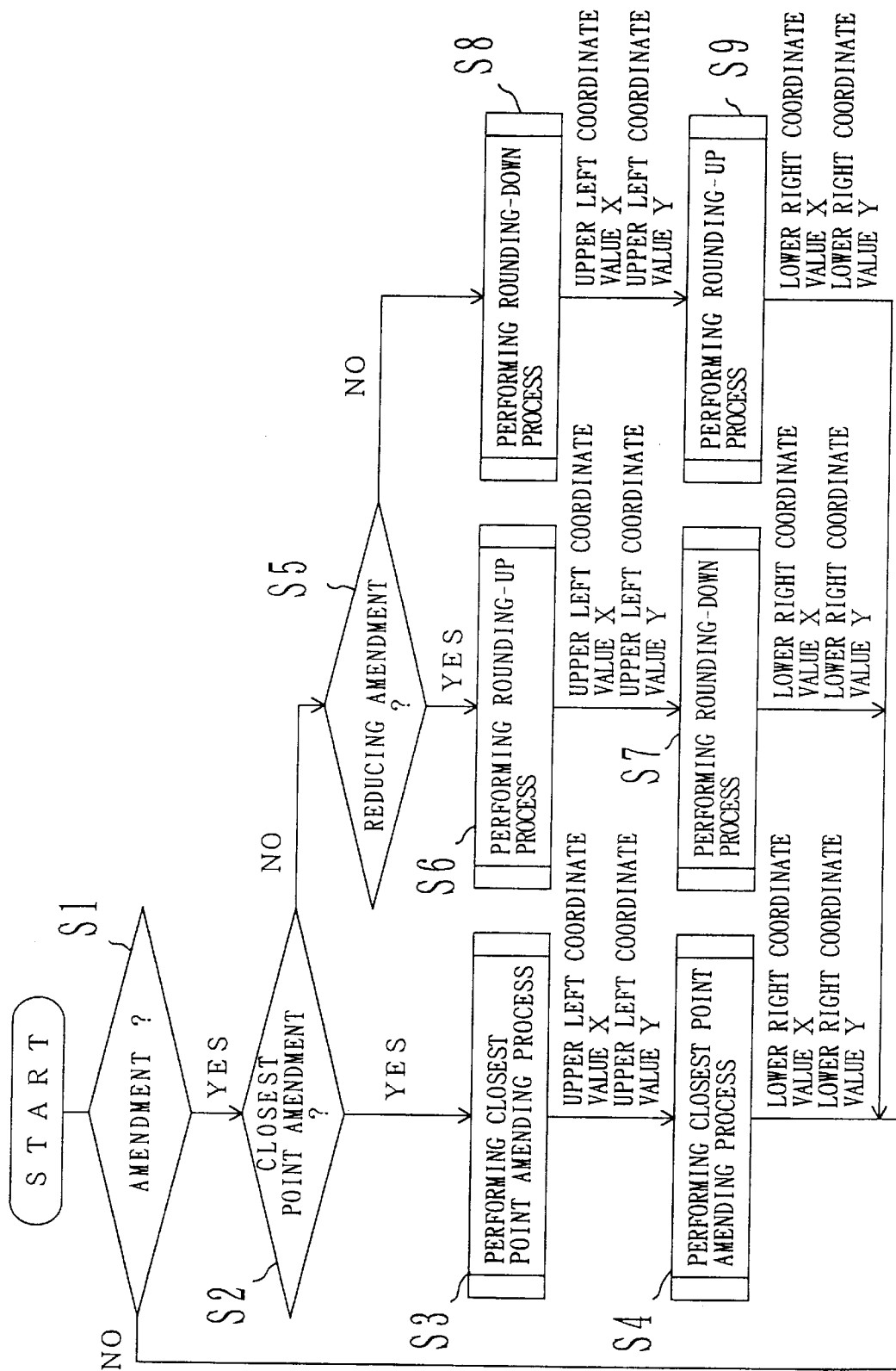
FIG. 9 is an operating flowchart of the coordinate amending process.

FIG. 9 is an operating flowchart of the coordinate amending process performed by the trimming unit 35 in #5. The input information in the coordinate amending process is the type of amendments, coordinate values of the segmented rectangle, and the number N of block picture elements in the compressing process. The type of amendments in the amending process can be the amendment for enlarging the segmented rectangle, the amendment for reducing the segmented rectangle, the amendment for the apex of the basic block (closest point), or no amendment. The coordinates of the segmented rectangle are the X coordinate of the upper left point (upper left coordinate value X), the Y coordinate of the upper left point (upper left coordinate value Y), the X coordinate of the lower right point (lower right coordinate value X), and the Y coordinate of the lower right point (lower right coordinate value Y). The number N of block picture elements refers to the number of picture elements forming one side of each basic block in the JPEG compressing process. For example, N=8 in the process shown in FIG. 1. The output information of the coordinate amending process refers to the coordinate value of the amended segmented rectangle.

When the process shown in FIG. 9 starts, the trimming unit 35 determines the type of the amendment n(step S1). The process terminates if no amendment is made. Otherwise, it is determined whether or not the amendment is made for the closest point (closest point amendment) (step S2). If yes, the closest point amending process is performed on the coordinate value of the upper left point (step S3), and then the closest point amending process is performed on the coordinate value of the lower right point (step S4), thereby terminating the process. If the type of the amendment does not refer to the closest point amendment in step S2, then it is determined whether or not the amendment is made for reduction (step S5). If yes, the rounding-up process is performed on the coordinate value of the upper left point (step S6), and then the rounding-down process is performed on the coordinate value of the lower right point (step S7), thereby terminating the process. If the reduction amendment is not made in step S5, it refers to an enlarging amendment. In this case, the rounding-down process is performed on the coordinate value of the upper left point (step S8), and then the rounding-up process is performed on the coordinate value of the lower right point (step S9), thereby terminating the process.

Figure 10:
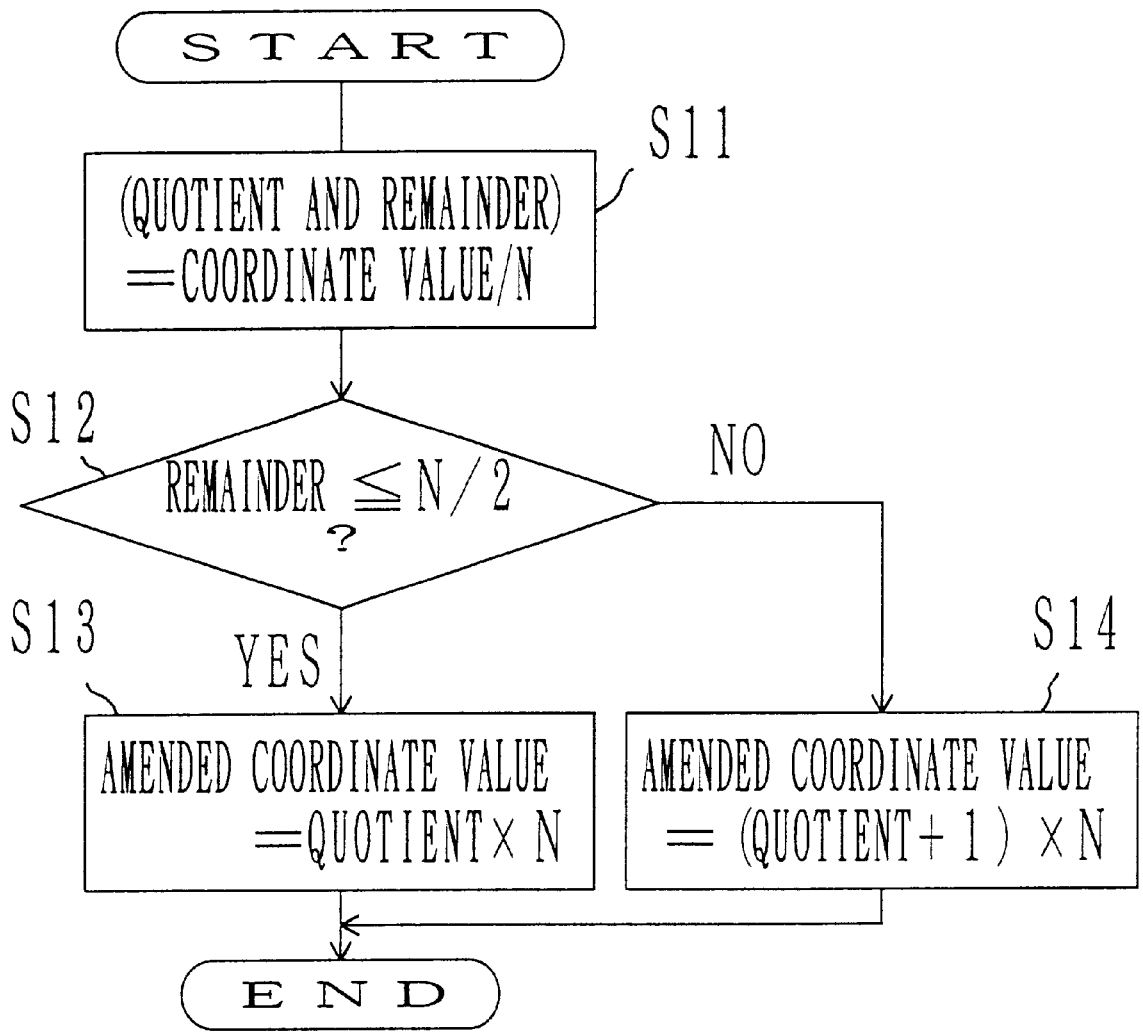
FIG. 10 is an operating flowchart of the closest point amending process.

FIG. 10 is an operating flowchart showing the closest point amending process in steps S3 and S4 shown in FIG. 9. When the process shown in FIG. 10 starts, the trimming unit 35 obtains the quotient and remainder by dividing the coordinate value to be processed by the number of blocks N (step S11). Next, it compares the remainder with N/2 (step S12). When the remainder is equal to or smaller than N/2, then the quotient multiplied by N is used as an amended coordinate value (step S13), thereby terminating the process. If the remainder is larger than N/2, then the product obtained by multiplying (quotient+1) by N is used as an amended coordinate value (step S14), thereby terminating the process.

Figure 11:
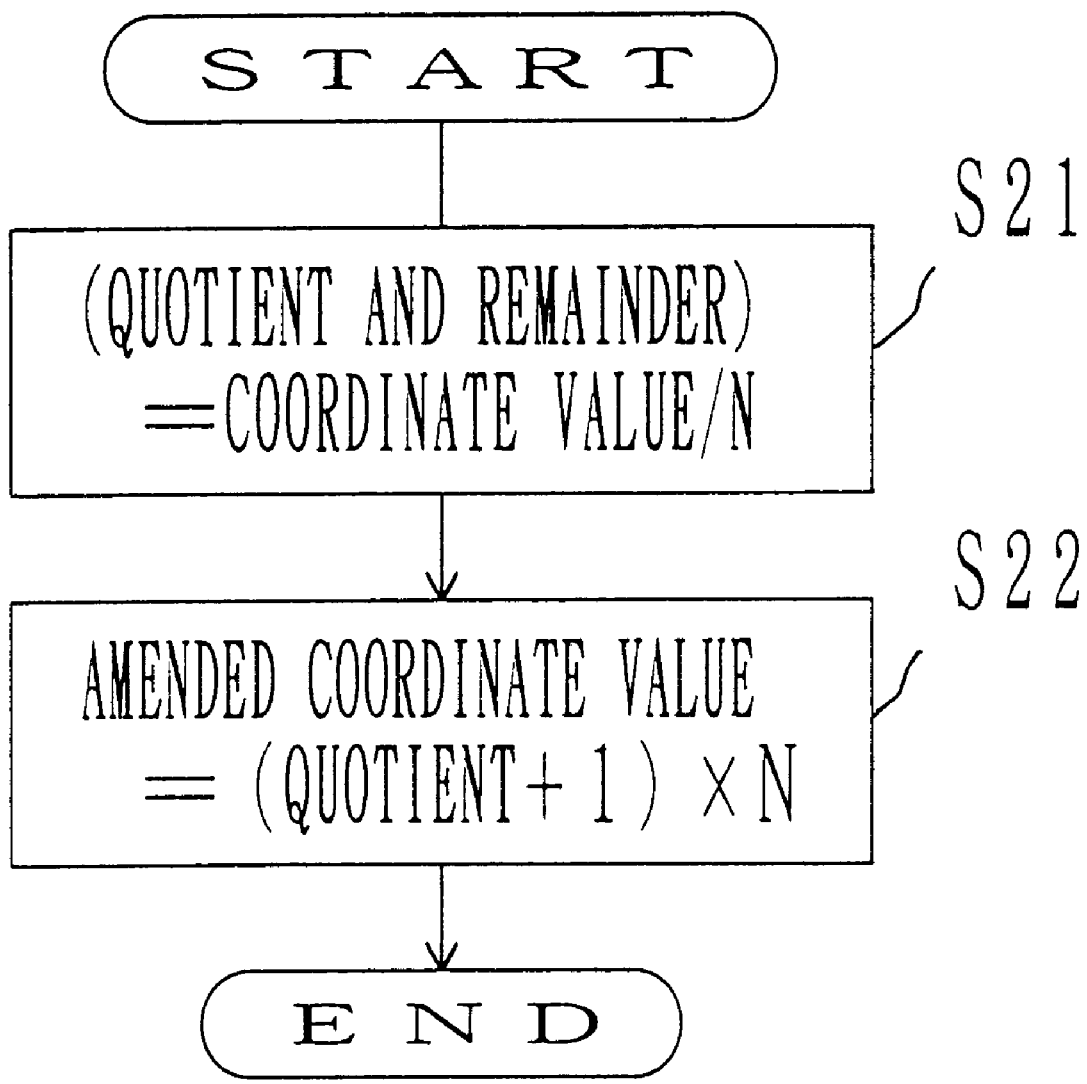
FIG. 11 is an operating flowchart of the rounding-up amending process.

FIG. 11 is an operating flowchart showing the rounding-up process in steps S6 and S9 shown in FIG. 9. When the process shown in FIG. 11 starts, the trimming unit 35 obtains the quotient and remainder by dividing the coordinate value to be processed by the number of blocks N (step S21). Then, the product obtained by multiplying (quotient+1) by N is used as an amended coordinate value (step S22), thereby terminating the process.

Figure 12:
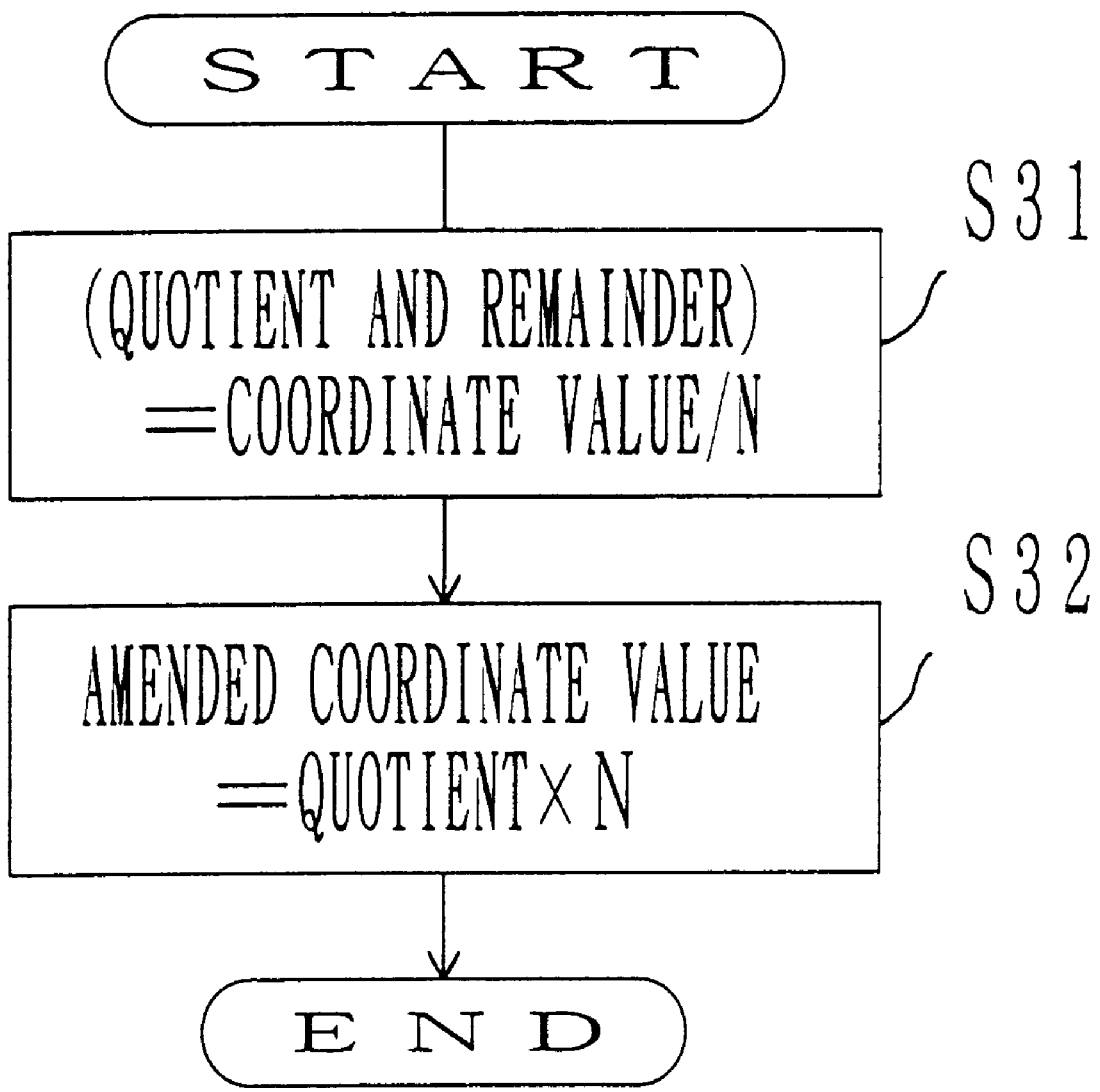
FIG. 12 is an operating flowchart of the rounding-down amending process.

FIG. 12 is an operating flowchart showing the rounding-down process in steps S7 and S8 shown in FIG. 9. When the process shown in FIG. 12 starts, the trimming unit 35 obtains the quotient and remainder by dividing the coordinate value to be processed by the number of blocks N (step S31). Then, the product obtained by multiplying the quotient by N is used as an amended coordinate value (step S32), thereby terminating the process.

Figure 13:
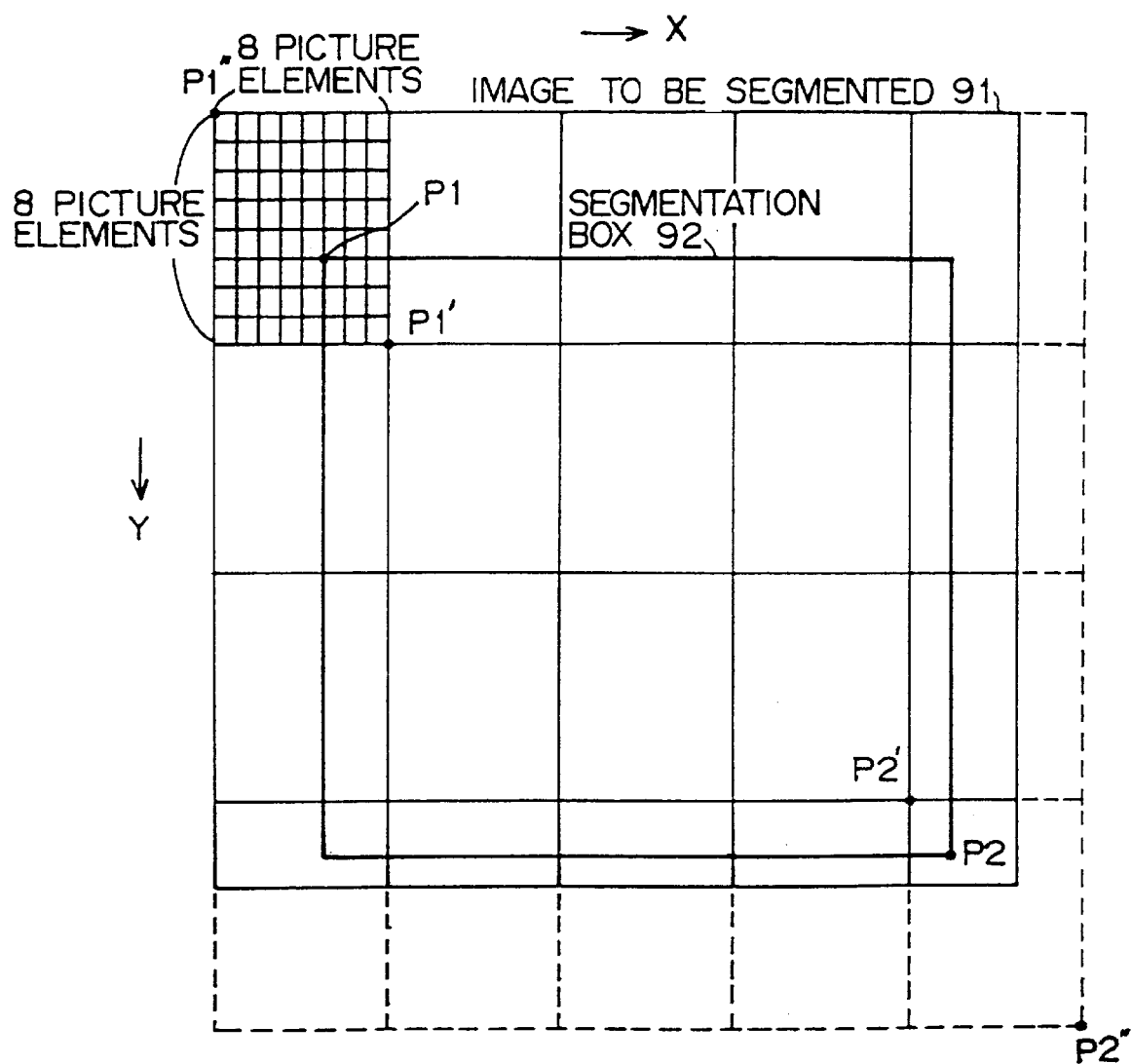
FIG. 13 shows an example of a segmentation box.

FIG. 13 shows an example of an operator-specified segmented box in the image display window 80. In FIG. 13, a image to be segmented 91 is divided into basic 8×8-picture-element blocks, and a segmentation box 92 is specified at a position off the boundary lines of the basic blocks. The positions of the upper left point P1 and lower right point P2 of the segmentation box 92 are represented by the X coordinate value and Y coordinate value on the XY plane. The X coordinate value becomes larger as the point moves in the right direction while the Y coordinate value becomes larger as the point moves downward. The right and bottom boundary lines of the image to be segmented 91 do not always match the boundary lines of the basic blocks represented by the broken lines, but actually the image to be segmented 91 is managed in basic block units. In this example, the portion in which no part of the image is contained stores NULL as picture element data.

If the image is segmented by the segmentation box 92 as specified by the operator, the basic blocks are destroyed and the quality of the picture is lowered when the image is compressed again. To prevent the deterioration of the quality of the image, the coordinate amending process is performed as shown in FIG. 9.

For example, assuming that it is determined in step S1 that the amendment type refers to the closest point amendment, each corner point of the segmentation box 92 is amended into the point closest to the corner point of the basic block containing the corner point of the segmentation box 92. First, the closest point amendment is made by inputting the X coordinate value of the point P1, and then the closest point amendment is made by inputting the Y coordinate value of the point P1 (step S3). As a result, the X coordinate value and Y coordinate value of the point P1 are increased (step S14), and the position of P1 is amended into P1'. Next, the closest point amendment is made by inputting the X coordinate value of the point P2, and then the closest point amendment is made by inputting the Y coordinate value of the point P2 (step S4). As a result, the X coordinate value and Y coordinate value of the point P1 are decreased (step S13), and the position of P2 is amended into P2'.

Figure 14:
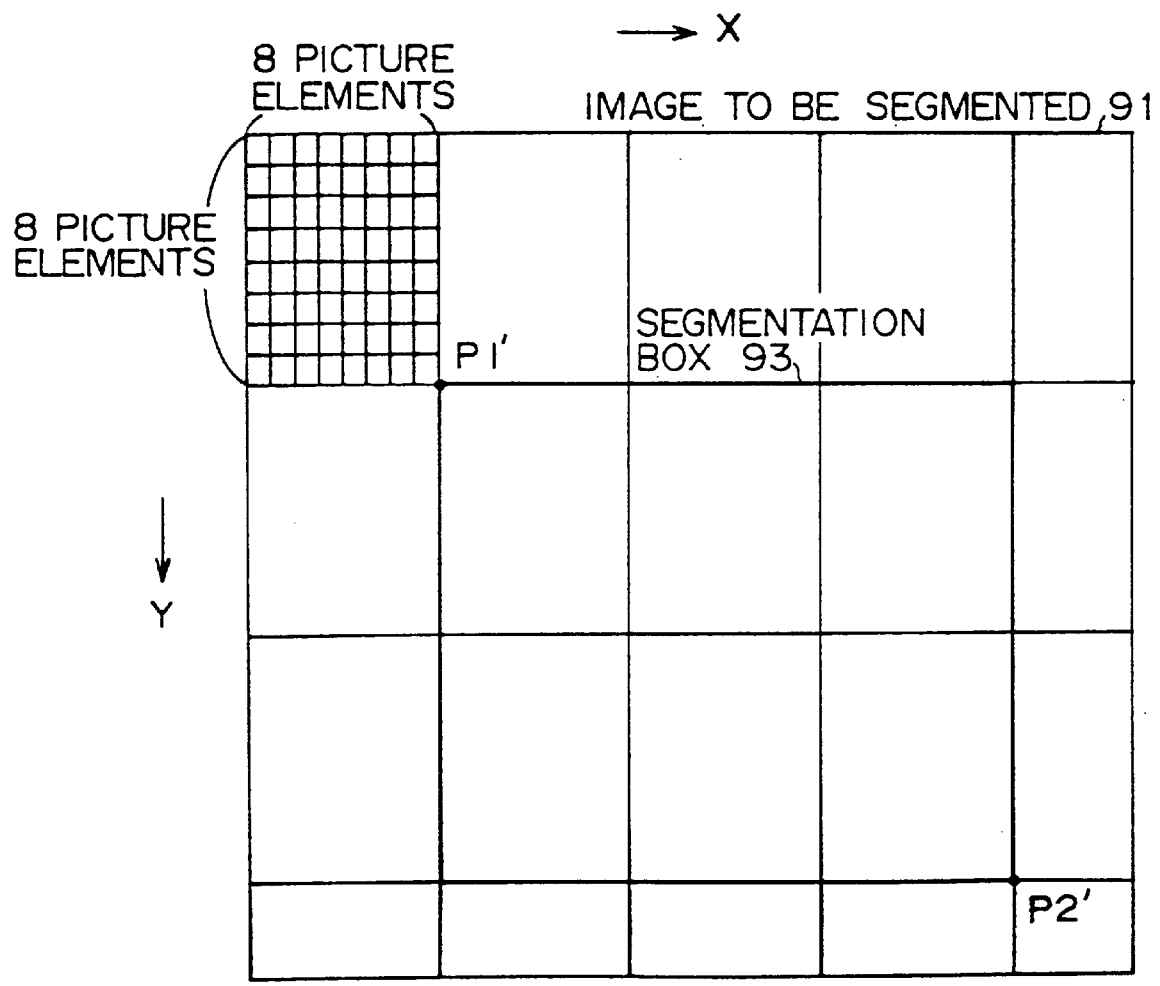
FIG. 14 shows an example of an amended segmentation box.

Thus, as shown in FIG. 14, a new segmentation box 93 is generated with P1' and P2' as corner points. The segmentation box 93 is formed by the boundary lines of the basic blocks. In this example, the closest point amendment is made in a way that the segmentation box 92 can be reduced. Therefore, the amended segmentation box after the reducing amendment matches the segmentation box 93 within the segmentation box 92.

Figure 15:
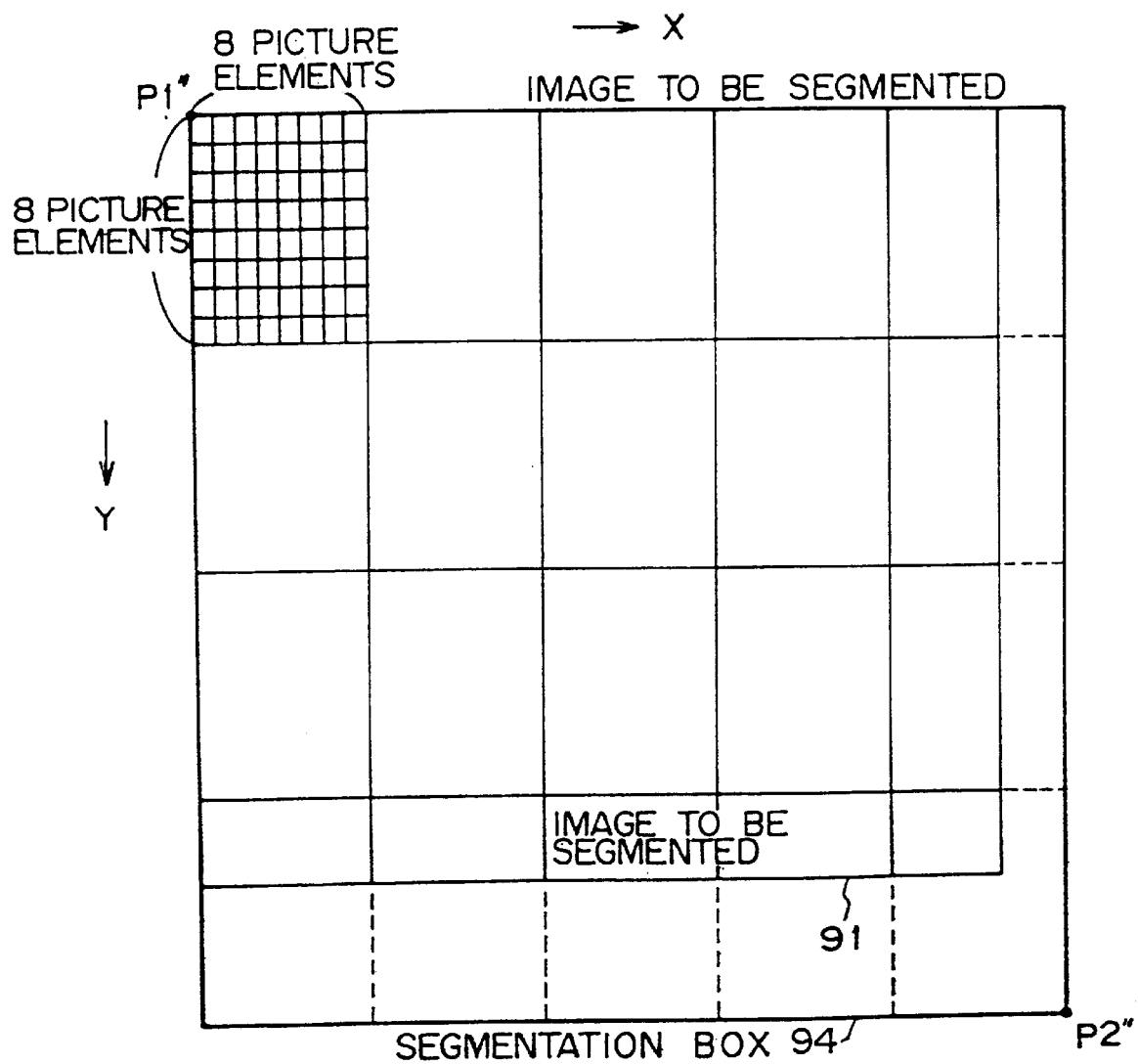
FIG. 15 shows another example of an amended segmentation box.

When the amendment type refers to the enlarging amendment, the position of each corner point is amended in a way that the amended segmentation box includes the segmentation box 92. First, the rounding-down amendment is made by inputting the X coordinate value of the point P1, and then the rounding-down amendment is made by inputting the Y coordinate value of the point P1 (step S8). As a result, the X coordinate value and Y coordinate value of the point P1 are decreased (step S32), and the position of P1 is amended into P1". Next, the rounding-up amendment is made by inputting the X coordinate value of the point P2, and then the rounding-up amendment is made by inputting the Y coordinate value of the point P2 (step S9). As a result, the X coordinate value and Y coordinate value of the point P2 are increased (step S22), and the position of P2 is amended into P2". Thus, as shown in FIG. 15, a new segmentation box 94 is generated with P1" and P2" as corner points.

The aspects of the present embodiment are described above. The image processing system according to the present invention is not limited to the application in the JPEG baseline compressing process, but can be used in other optional image compressing methods. For example, the coordinate values can be likewise amended in the image compressing method through other normal transformations instead of the DCT transformation such as Fourier transformation, Hadamard transformation, etc.

Furthermore, the size of the basic block in the compressing process is not limited to 8×8 picture elements, but images can be compressed and coordinate-amended in logical blocks of optional number of picture elements. In the above described coordinate amendment, the coordinates of the upper left and lower right points of the segmentation box are used as positional information, but the position and size of the segmentation box can also be represented by other type of information. For example, the coordinate of one corner point of the segmentation box and the length of each of the vertical and horizontal sides of the segmentation box can be used as the positional information, thereby amending and generating a new segmentation box.

As described above, the quality of the image can be prevented from being lowered according to the present invention when a specified image process is performed by repeating the compressing and enlarging processes on a compressed static image. It is attained because the operator-specified image box can be amended such that the image box matches the outlines of the basic blocks without the rounding of data when a recompressing process is performed.

What is claimed is:

1. An image processing device for performing an image process on image data of an enlarged static image, the image processing device comprising:

input means for generating the image data;

image box specifying means for specifying an image box within an image represented by the image data;

box information storage means for storing positional information about the specified image box;

amending means for amending the positional information stored in said box information storage means according to a predetermined standard for a compression process; and processing means for cutting a part of the image data along the amended image box.

2. The image processing device according to claim 1 further comprising:

compressing means for compressing the part of the image data cut by said processing means.

3. The image processing device according to claim 2 further comprising:

compressed data storage means for storing plural pieces of the compressed image data compressed by said compressing means.

4. The image processing device according to claim 1, wherein said amending means amends the positional information such that the amended image box can be formed along outlines of logical picture element blocks used in a compressing process.

5. The image processing device according to claim 4, wherein said amending means amends the positional information such that the specified image box is included in the amended image box.

6. The image processing device according to claim 4, wherein said amending means amends the positional information such that the amended image box is included in the specified image box.

7. The image processing device according to claim 4, wherein said amending means amends the positional information such that the amended image box is formed on the outlines of the blocks closest to the specified image box.

8. The image processing device according to claim 1, wherein said amending means amends the positional information such that the amended image box is formed on the outlines of the logical picture element blocks used in a joint-photographic-expert-group base line compressing process.

9. The image processing device according to claim 1, wherein said processing means segments an image enclosed by the amended image box and outputs partial image data corresponding to the segmented image.

10. The image processing device according to claim 1, wherein said image box specifying means specifies a rectangle in the image represented by the input image data as the image box; and said box information storage means stores coordinate values of two corner points in a diagonal line of the rectangle as the positional information.

11. An image processing device for performing an image process on image data of an enlarged static image, the image processing device comprising:

box information storage means for storing box information about an image box specified within an image represented by image data; and amending means for amending the box information stored in said box information storage means according to block units used in a predetermined compressing process.

12. A program stored on a computer-readable storage medium for processing image data of an enlarged static image, the program comprising the functions of:

inputting image data;

specifying an image box within the image represented by the input image data;

amending positional information about the specified image box according to a predetermined standard for a compression process; and cutting a part of the image data along the amended image box.

13. The program according to claim 12, further performing the function of:

compressing the cut part of image data.

14. The program according to claim 12 further performing the function of:

segmenting an image enclosed by the amended image box, and outputting partial image data corresponding to the segmented image when the image data is processed using the amended image box.

15. An image processing method for performing an image process on image data of an enlarged static image, the method comprising the steps of:

specifying an image box within an image represented by the input image data;

storing positional information about the specified image box;

amending the stored positional information according to a predetermined standard for a compression process; and cutting a part of the image data along the amended image box.

16. The image processing method according to claim 15, further comprising:

compressing the cut image data.

17. The image processing method according to claim 15, wherein an image represented by the image data enclosed by the amended image box is segmented; and partial image data corresponding to the segmented image is output.

* * * * *